(12) United States Patent
Moore

(10) Patent No.: US 8,905,688 B1
(45) Date of Patent: Dec. 9, 2014

(54) PORTABLE BORING BAR APPARATUS

(76) Inventor: Chester Eugene Moore, Howard, OH (US)

( * ) Notice: Subject to any disclaimer, the term of this patent is extended or adjusted under 35 U.S.C. 154(b) by 361 days.

(21) Appl. No.: 13/558,403

(22) Filed: Jul. 26, 2012

(51) Int. Cl.
*B23B 45/14* (2006.01)

(52) U.S. Cl.
USPC ............ 408/75; 408/54; 408/80; 408/102; 408/708

(58) Field of Classification Search
USPC .......... 408/54, 79, 80, 81, 82, 102, 138, 708, 408/75
See application file for complete search history.

(56) References Cited

U.S. PATENT DOCUMENTS

| | | | |
|---|---|---|---|
| 1,417,278 A * | 5/1922 | Peters | 408/75 |
| 4,406,566 A * | 9/1983 | Bauer | 408/129 |
| 4,850,756 A * | 7/1989 | Dubois | 408/72 R |
| 4,932,814 A | 6/1990 | York | |
| 5,642,969 A * | 7/1997 | Strait | 408/124 |
| 5,785,466 A | 7/1998 | Haynes | |
| 5,954,462 A * | 9/1999 | Way et al. | 408/153 |
| 2010/0189522 A1 | 7/2010 | Esslinger | |
| 2010/0310328 A1 * | 12/2010 | Wilkins | 408/1 R |

* cited by examiner

*Primary Examiner* — Daniel Howell
*Assistant Examiner* — Chwen-Wei Su
(74) *Attorney, Agent, or Firm* — Mark A. Navarre

(57) ABSTRACT

An improved portable boring bar apparatus includes a small hydraulic motor and drive mechanism for rotating a cylindrical boring bar and axially advancing it in the cutting direction. The boring bar is received in a drive housing, and a support arm affixed to the drive housing includes a bearing for rotationally supporting the boring bar, and a mounting tongue that extends radially beyond the drive housing for attachment to a workpiece mounting arm. At set-up, the workpiece mounting arm is temporarily joined to a set-up support arm identical to the drive housing support arm, and the arms so joined are positioned such that the bearing of the set-up support arm is centered relative to a workpiece pilot hole. The workpiece mounting arm is tack-welded to the workpiece, and the drive housing support arm is joined to the workpiece mounting arm in place of the set-up support arm.

8 Claims, 5 Drawing Sheets

PORTABLE BORING BAR APPARATUS

TECHNICAL FIELD

The present invention relates to a portable mechanism for boring axially aligned holes in heavy metal work-pieces such as backhoe or loader buckets.

BACKGROUND OF THE INVENTION

Boring bar machines, sometimes referred to as line boring machines, are used to bore or re-bore relatively a large diameter opening or multiple axially aligned openings in heavy metal work-pieces such as construction implements. Typically, the openings on the implement are moved into alignment with similar sized openings on a machine boom or arm, and one or more pins are driven through the aligned openings to pivotally couple the implement to the machine. Sometimes a new opening must be bored to adapt an implement to a machine produced by a different manufacturer, and other times, an existing set of openings become worn and need to be re-constructed to restore the proper diameter and concentricity.

Since the boring work is typically carried out in a remote shop or in the field where the construction machinery is being used, it is important that the boring bar machine be portable and lightweight so that it can be handled by one person, easily and accurately deployed and affixed to a work-piece, and operated by a safe and readily available power source.

SUMMARY OF THE INVENTION

The present invention is directed to an improved portable boring bar apparatus for boring a hole through a workpiece concentric with a workpiece pilot hole, where the boring bar apparatus can be used in a remote location, and can be easily set up and operated by one person. A small hydraulic motor rotates the boring bar and a threaded rod that is parallel with the boring bar. A coupler joins the boring bar to the threaded rod so that rotation of the threaded rod by the hydraulic motor axially advances the boring bar in the cutting direction. A cam-follower linkage coupling the hydraulic motor to the threaded rod is selectively disengaged to enable manual axial retraction of the boring bar by manually cranking the threaded rod in the reverse direction. Additionally, the coupler may be disengaged from the boring bar to enable axial repositioning of the boring bar relative to the coupler.

The hydraulic motor, the boring bar, the threaded rod and the cam-follower linkage are received in a drive housing, and a support arm affixed to the drive housing is used to support the drive housing and boring bar with respect to the workpiece to be bored. The inboard end of the drive housing support arm includes a bearing for rotationally supporting the boring bar, while the outboard end extends radially beyond the drive housing for attachment to a workpiece mounting arm. To set up the boring bar apparatus, the workpiece mounting arm is temporarily joined to a set-up support arm that is identical to the drive housing support arm, and the arms so joined are positioned such that the workpiece mounting arm is in registry with the workpiece while the bearing of the set-up support arm is centered with respect to the workpiece pilot hole. The workpiece mounting arm is then tack-welded to the workpiece, and the drive housing support arm is joined to the workpiece mounting arm in place of the set-up support arm. To reliably center the bearing of the set-up support arm with respect to the workpiece pilot hole, a cylindrical set-up bar is routed though the bearing and the pilot hole, and a conical centering member axially slidable on the set-up bar is pressed against the workpiece pilot hole.

DESCRIPTION OF THE PREFERRED EMBODIMENT

Figure 1:
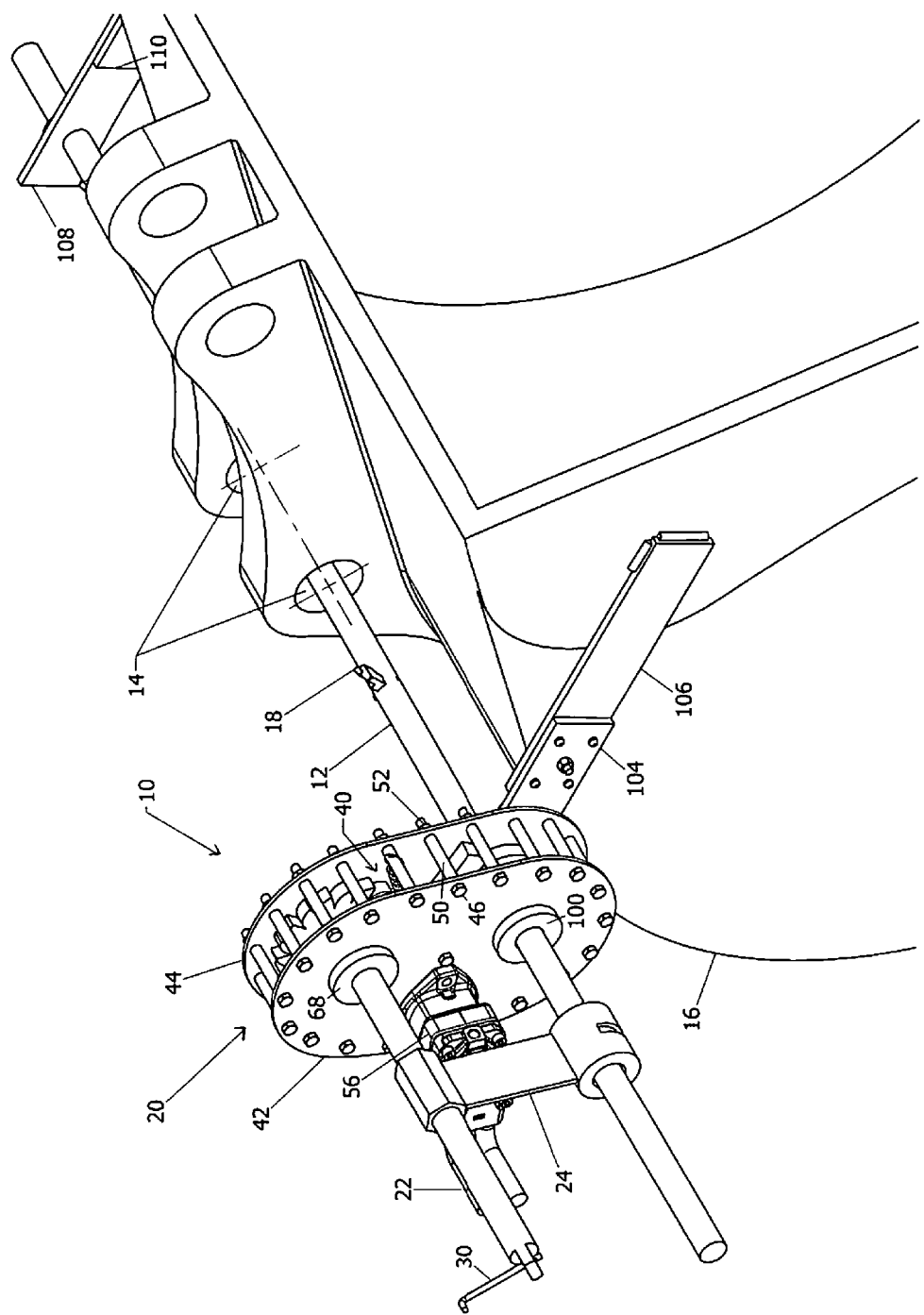
FIG. 1 is an isometric representation of the portable boring bar apparatus of this invention, as affixed to a workpiece.

Referring to FIG. 1, the reference numeral 10 generally designates a portable boring bar apparatus according to this invention. In general, the boring bar apparatus 10 is a portable hydraulically powered boring tool that includes a long cylindrical boring bar 12 adapted to be inserted through a pilot hole 14 (or a set of axially aligned pilot holes) formed in a heavy metal workpiece 16 such as a mounting bracket of backhoe bucket. The apparatus 10 is rigidly supported with respect to the workpiece 16 with the boring bar 12 centered in the pilot hole(s) 14, so that when the boring bar 12 is rotated and axially advanced in the direction of the workpiece 16, a cutting tool 18 radially protruding from the periphery of the boring bar 12 bores a new opening(s) that is concentric with the pilot hole(s) 14. The cutting tool 18 is releaseably supported in the boring bar 12 with a set-screw or the like to permit adjustment of its radial protrusion, as the boring process typically involves several successive passes of the cutting tool 18 through the workpiece 16.

The boring bar apparatus 10 differs from many prior boring bar tools in that it is lightweight so that it can be easily handled by one person, inexpensive to manufacture, easily and accurately deployed and affixed to a workpiece 16, and hydraulically operated for safe and reliable use at a remote building or job site. The hydraulic pressure can be provided by the work truck used to transport the boring bar apparatus 10 to the job site, or by any conventional stationary or portable source.

In addition to the boring bar 12 and cutting tool 18, the apparatus 10 includes a drive assembly 20, a threaded rod 22 and a coupler 24 coupling the boring bar 10 and the threaded rod 22. In general, the boring bar 12 and threaded rod 22 are received by the drive assembly 20, and the drive assembly 20 rotatably drives both the boring bar 12 and threaded rod 22. Due to the operation of coupler 24, rotation of the threaded rod 22 produces axial translation of the boring bar 12 in the direction of the workpiece 16.

Figure 2:
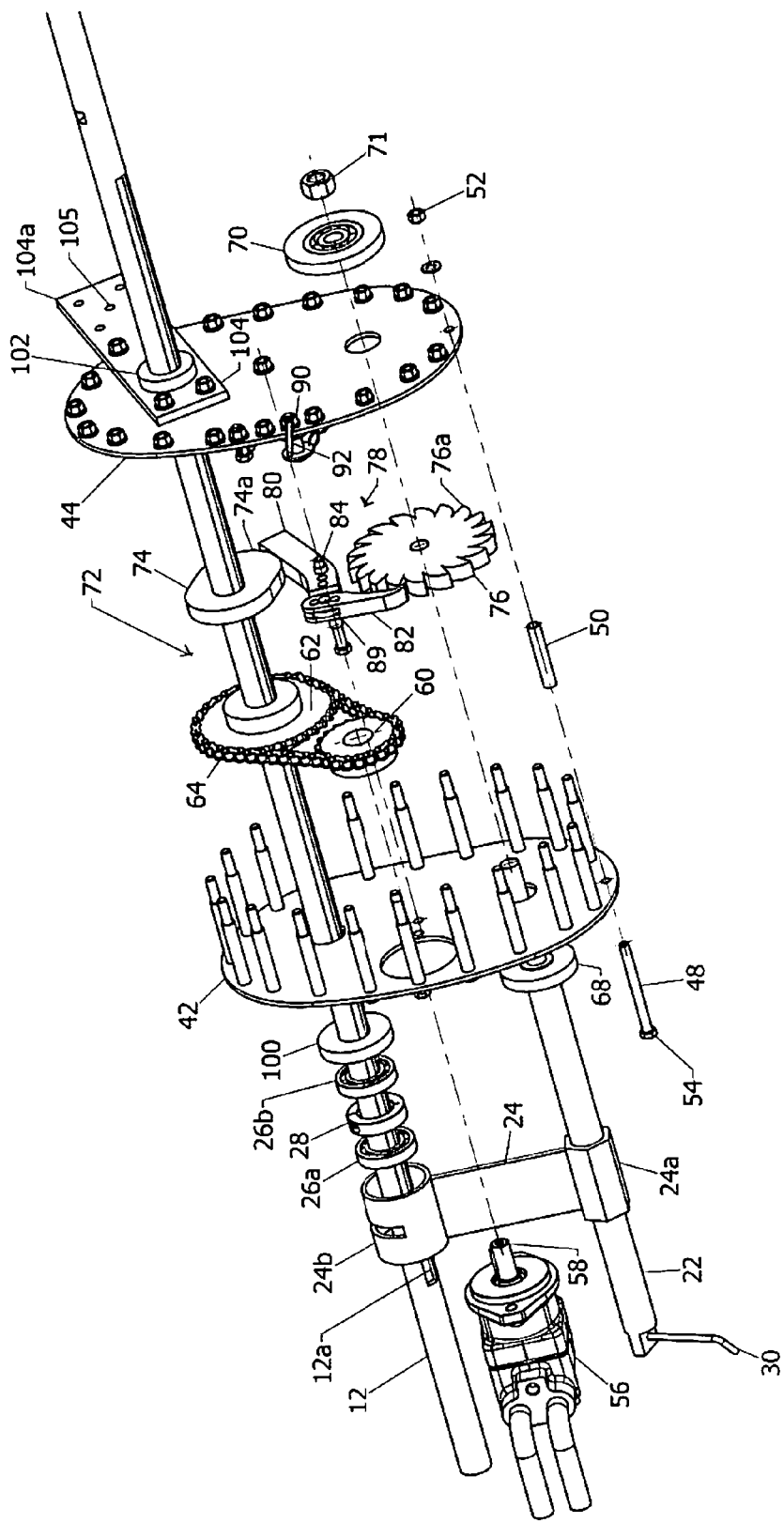
FIG. 2 is an exploded view of the portable boring bar apparatus of FIG. 1.

Referring particularly to FIG. 2, the coupler 24 has a first end 24a in threaded engagement with the threaded rod 22 so that rotation of the threaded rod produces axial movement of the coupler 24, and a second end 24b through which the boring bar 12 passes. The second end 24b of coupler 24 includes a pair of axially separated bearings 26a, 26b that rotatably support the boring bar 12 and a clamp member 28 disposed between the bearings 26a, 26b. The girth of the clamp member 28 may be adjusted by loosening or tightening a screw that is accessible in the gap between the two bearings 26a, 26b. When the girth of the clamp member 28 is relaxed, the boring bar 12 may be axially advanced or retracted relative to the coupler 24, which is useful during the set-up procedure when the boring bar apparatus 10 is being configured for a boring operation. However, when the girth clamp member 28 is tensioned so that it tightly grips the boring bar 12, axial movement of the coupler 24 produces axial movement of the boring bar 12 as one or the other of the bearings 26a, 26b pushes on the clamp member 28. When the drive assembly 20 rotates the threaded rod 22, the coupler 24 moves toward the drive assembly 20, and the bearing 26a pushes on clamp member 28 to axially advance the boring bar 12 and cutting tool 18. On the other hand, when the drive assembly 20 is disengaged from the threaded rod 22, and the threaded rod 22 is manually rotated in the reverse direction with the hand crank 30 on the outboard end of threaded rod 22, the coupler 24 moves away from the drive assembly 20, and the bearing 26b pushes on clamp member 28 to axially retract the boring bar 12 and cutting tool 18.

The drive assembly 20 includes an open housing 40 defined by a pair of metal plates 42, 44 separated by a number of spacers of equal length distributed about the peripheral margins of plates 42, 44. In the illustrated embodiment, each of the spacers simply comprises a bolt 48 passing though aligned openings in the plates 42, 44, a metal bushing 50 disposed about the bolt 48 between the plates 42, 44, and a lock nut 52 threaded onto the end of the bolt 48. The head 54 of bolt 48 bears against the outboard face of the plate 42, and the lock nut 52 (or an intervening washer) bears against the outboard face of the plate 44.

A hydraulic motor 56 is mounted on the outboard face of plate 42. The motor shaft 58 passes through an opening in plate 42, and a drive sprocket 60 is fastened on the end of shaft 58 for rotation therewith. A driven sprocket 62 keyed onto the boring bar 12 is radially aligned with the drive sprocket 60, and a chain 64 couples the drive and driven sprockets 60 and 62. The boring bar 12 is provided with an axial channel 12a, and the driven sprocket 62 is keyed into the channel 12a so that it can rotatably drive the boring bar 12, while permitting axial translation of the boring bar 12 relative to the driven sprocket 62.

Figure 3:
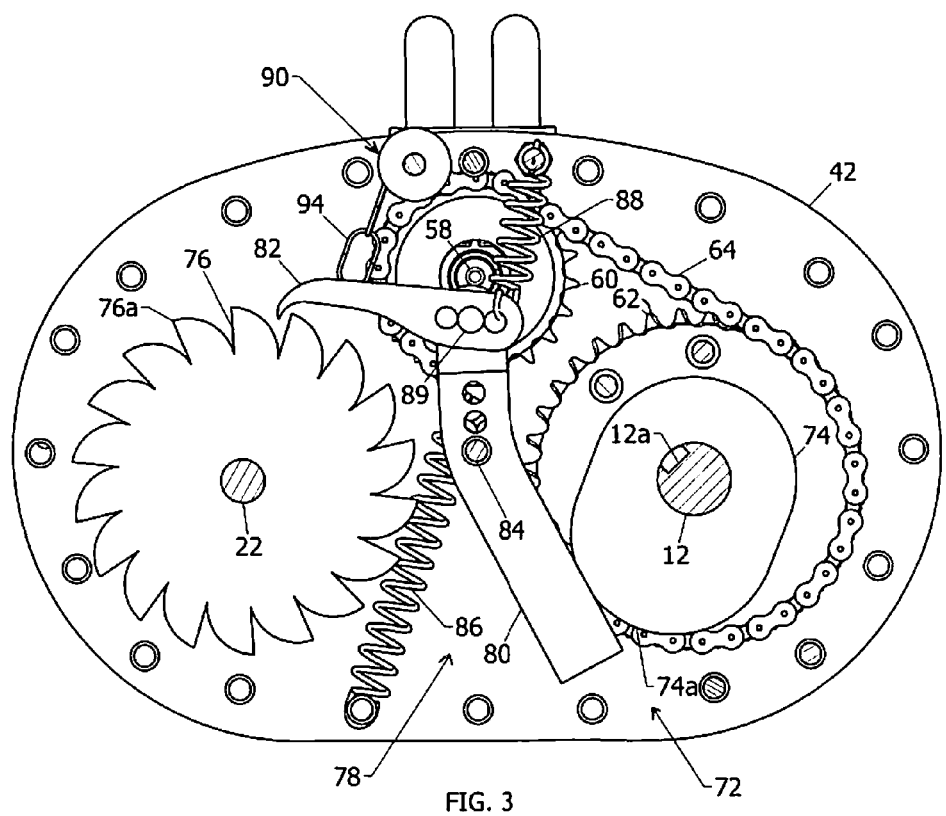
FIG. 3 is a section view of the portable boring bar apparatus of FIG. 1.

The threaded rod 22 is rotatably supported by a pair of bearings 68, 70 mounted on the plates 42, 44 of drive assembly housing 40, and a nut 71 threaded onto the end of threaded rod 22 axially fixes rod 22 relative to the housing 40. A selectively engageable indexing mechanism 72 is adapted to rotatably drive the threaded rod 22 in proportion to the rotation of boring bar 12. As best seen in FIGS. 2-3, the indexing mechanism 72 includes a cam wheel 74 ganged with the driven sprocket 62 for rotation therewith, a gear 76 fastened onto the threaded rod 22 between the plates 42 and 44, and a cam follower linkage assembly 78 coupling the cam wheel 74 to the teeth 76a of gear 76. As best seen in FIG. 3, the cam follower linkage assembly 78 includes first and second arms 80 and 82, a pivot pin 84 bridging the plates 42 and 44, and a pair of springs 86 and 88. The inboard ends of the first and second arms 80 and 82 are pivotably coupled by a pin 89, and the first arm 80 is pivotably mounted at its midsection on the pivot pin 84. The spring 86 biases the free end of the first arm 80 into engagement with the periphery of the cam wheel 74, and the spring 88 biases the free end of the second arm 82 into engagement with the teeth 76a of gear 76. With each rotation of the boring bar 12, the lobe 74a of cam wheel 74 rotates toward an apex position, and the first arm 80 pivots about pin 84, producing a rocking motion of the second arm 82 that causes its outboard end to push against a tooth 76a of gear 76 and thereby incrementally rotate gear 76 and threaded rod 22. In the illustrated embodiment where the gear 76 is provided with, say, 40 teeth, each rotation of the boring bar 12 will thus produce one-fortieth of a revolution of the gear 76. And since rotation of the threaded rod 22 produces axial translation of the boring bar 12 due to the operation of coupler 24 as described above, the boring bar 12 is incrementally advanced in a forward axial direction with each forward (driven) revolution. In the illustrated embodiment, for example, the boring bar 12 advances axially by 0.0035 inch with each revolution.

A disengagement mechanism 90 is provided for selectively disengaging the cam follower assembly 78 so that the threaded rod 22 may be manually rotated in the reverse direction via hand crank 30 to retract the boring bar 12 as mentioned above. The disengagement mechanism 90 comprises a lever 92 rotatably supported near the periphery of plate 44 and a chain 94 coupling the inboard end of lever 92 to the second cam follower arm 82, so that manual rotation of the lever 92 lifts the second arm 82 out of engagement with the teeth 76a of gear 76. Preferably, the lever 92 is provided with a detent position or over-center effect to overcome the opposing bias of spring 88 so that the lever 92 will be stable in the disengaged position.

The boring bar 12 is rotatably supported within the drive assembly 20 by a first bearing 100 mounted on the outboard face of housing plate 42 and a second bearing 102 mounted a housing support arm 104 that is bolted or welded to the outboard face of housing plate 44. The outboard end 104a of the housing support arm 104 extends radially beyond the drive assembly housing 40, and is provided with a set of mounting holes 105 for attachment to a workpiece mounting arm 106, depicted in FIGS. 4-5. The opposite or outboard end of the workpiece mounting arm 106 is adapted to be welded to the workpiece 16 to support the boring bar apparatus 10 with respect to the workpiece 16. A second identical support arm 108 and bearing 109 (referred to herein as outboard support arm 108) and workpiece mounting arm 110 are provided for supporting the outboard end of the boring bar 12.

Figure 4:
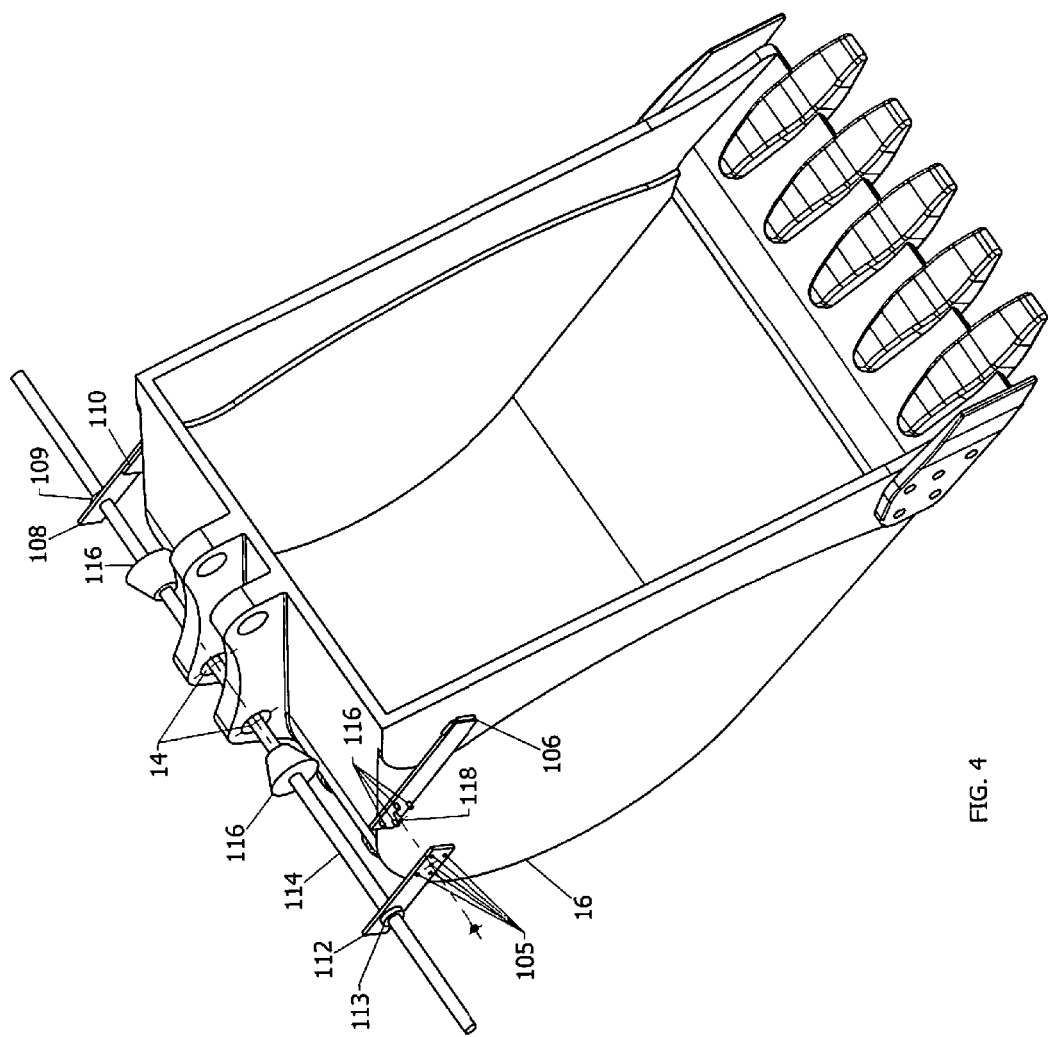
FIG. 4 is an isometric representation of a centering apparatus for the portable boring bar apparatus of this invention.

One important aspect of the boring bar apparatus 10 pertains to features that enable a worker to easily and accurately set up the boring bar apparatus 10 at a job site. According to this invention, the set up procedure is significantly simplified through the use of a set-up support arm 112 that is identical to the housing and outboard support arms 104 and 108. To set up the boring bar apparatus 10, the workpiece mounting arm 106 is temporarily joined to the set-up support arm 112 (as illustrated in FIG. 4) instead of the housing support arm 104, and the two support arms (that is, the set-up support arm 112 and the outboard support arm 108, with workpiece mounting arms 106 and 110 attached) are positioned such that the workpiece mounting arms 106 and 110 are in registry with the workpiece 16 while the bearings 113 and 109 of the two support arms 112 and 108 are centered with respect to the workpiece pilot hole(s) 14. There are various ways of doing this, but a convenient way in most cases is to route a cylindrical set-up bar 114 (similar in diameter to boring bar 12) through the bearings 113 and 109 and the pilot hole(s) 14, and to tack-weld the workpiece mounting arms 106 and 110 to the workpiece 16 when the set-up bar 114 is centered in the pilot hole(s) 14. The set-up bar 114 can be centered in the pilot hole(s) 14 with shims, but preferably, one or more conical centering members 116 axially slidable on the set-up bar 114 can be pressed against pilot hole(s) 14 to center the set-up bar 114. The tip of a given centering member 116 seats in a respective pilot hole 14 and automatically centers the set-up bar 114 with respect to the pilot hole 14.

Figure 5:
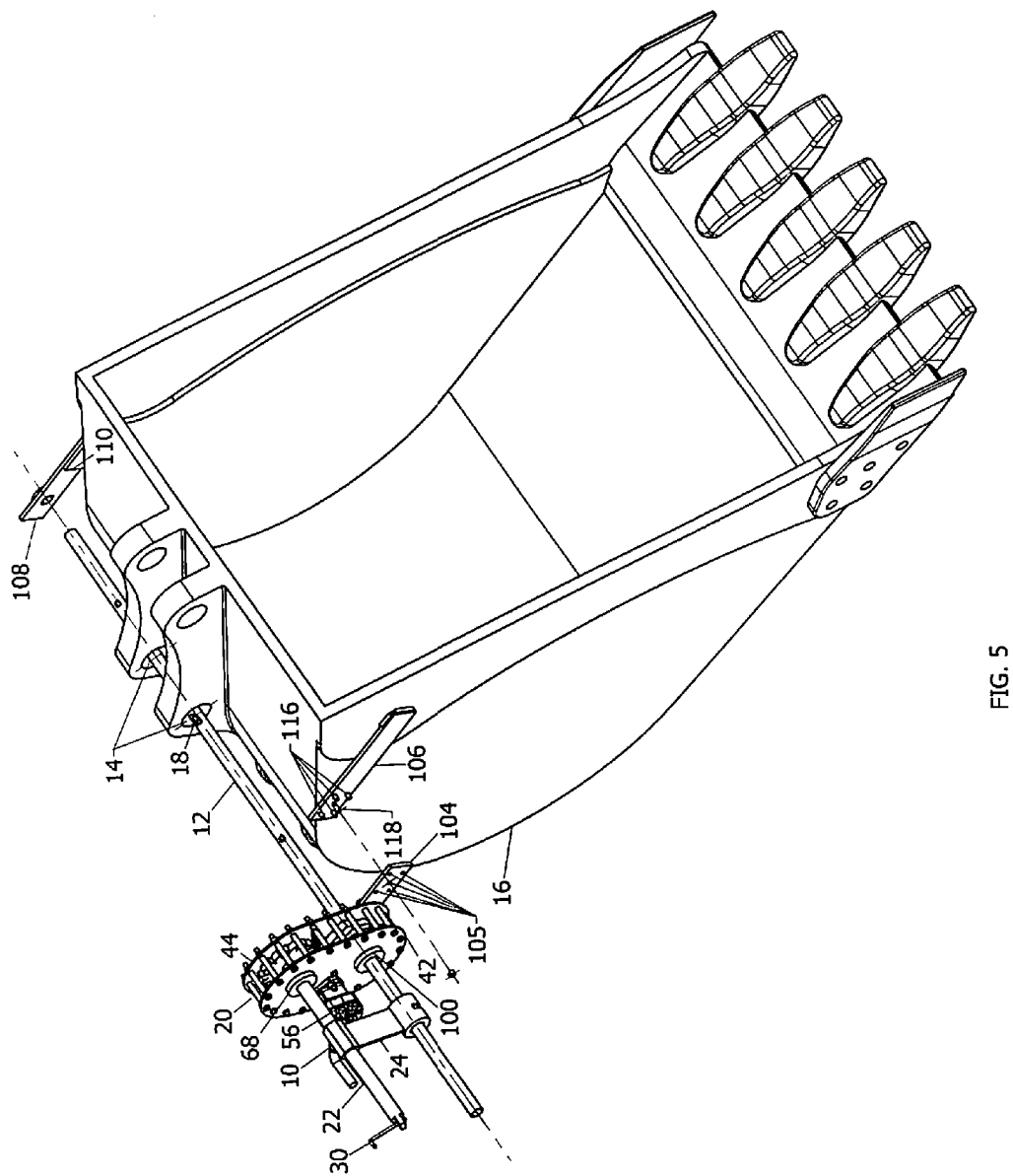
FIG. 5 is an isometric representation of the portable boring bar apparatus of this invention during an installation procedure.

Once the set-up bar 114 is centered with respect to the pilot hole(s) 14 and the workpiece mounting arms 106 and 110 have been tack welded to the workpiece 16, the set-up bar 114 is removed and the set-up support arm 112 is detached from the workpiece mounting arm 106. Then the drive assembly 20 is manipulated so as to route the outboard end of boring bar 12 through the pilot hole(s) 14 and the bearing 109 of outboard support arm 108, after which the housing support arm 104 is attached to the workpiece mounting arm 106, as illustrated in FIG. 5. At such point, the boring bar apparatus 10 will have been accurately mounted to the workpiece 16, enabling commencement of the boring process.

To facilitate the detachment and attachment of the support arms 112 and 104 to the workpiece mounting arm 106 during the set-up procedure, the workpiece mounting arm 106 may be provided with locating pins that seat in the mounting holes 105 of the support arms 112, 104. In the illustrated embodiment, for example, the support arms 112, 104 have a set of five mounting holes 105 in their outboard end, and the workpiece mounting arm 106 is provided with a set of four locating pins 116 and one bolt 118; in this case, detaching the set-up support arm 112 from the workpiece mounting arm 106 is accomplished by removing one bolt 118, and subsequently attaching the housing support arm 104 to the workpiece mounting arm 106 is likewise accomplished by installing one bolt 118. Preferably, the bolt 118 is fixed in the workpiece mounting arm 106, as indicated in FIGS. 4-5.

Figure 6:
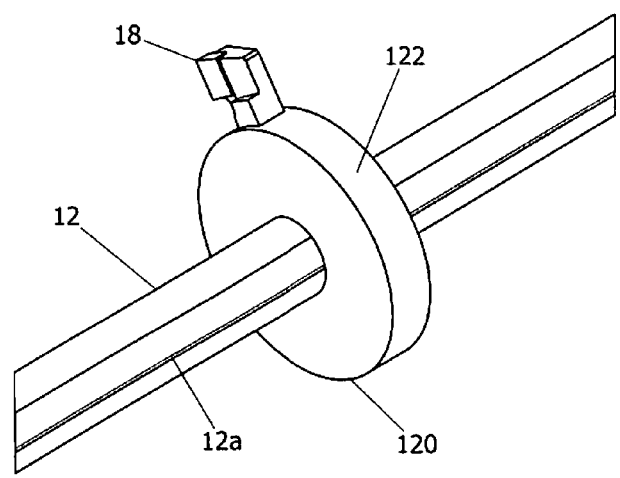
FIG. 6 is an isometric representation of a wheel affixed to the boring bar apparatus of FIG. 1 to radially extend the cutting diameter.

FIG. 6 illustrates another advantageous aspect of the boring bar apparatus that is useful when boring large diameter holes in a workpiece 14. In such case, a wheel 120 is affixed to the outboard portion of the boring bar 12 in place of the cutting tool 18, and the cutting tool 18 is mounted in the radial periphery 122 of wheel 120 to radially extend the cutting tool 18.

While the present invention has been described with respect to the illustrated embodiment, it is recognized that numerous modifications and variations in addition to those mentioned herein will occur to those skilled in the art. Accordingly, it is intended that the invention not be limited to the disclosed embodiment, but that it have the full scope permitted by the language of the following claims.

The invention claimed is:

1. A boring bar apparatus for boring an opening through a workpiece centered with respect to a pilot hole of the workpiece, comprising:
    an elongate cylindrical boring bar adapted to extend through said pilot hole, said boring bar having an outboard portion in which is supported a rotary cutting tool for boring the opening in the workpiece;
    a drive apparatus receiving an inboard portion of said boring bar for rotating and axially translating the boring bar to bore the opening in the workpiece with the cutting tool;
    a workpiece mounting arm adapted to be welded to the workpiece;
    a drive apparatus support arm for supporting the drive apparatus and the boring bar, said drive apparatus support arm having an inboard end including a bearing rotatably supporting said boring bar and an outboard end extending radially beyond the drive apparatus for attachment to said workpiece mounting arm; and
    a set-up support arm temporarily attached to said workpiece mounting arm, said set-up support arm being identical to the drive apparatus support arm, whereby once said set-up support arm is positioned so that its bearing is centered with respect to said pilot hole, and said workpiece mounting arm is welded to the workpiece, said outboard end of said drive apparatus support arm is attached to said workpiece mounting arm in place of said set-up support arm.

2. The boring bar apparatus of claim 1, further comprising:
a cylindrical set-up bar rotatably supported in the bearing of said set-up support arm, and adapted to extend through the pilot hole of said workpiece; and
a centering member axially slidable on said set-up bar for centering said set-up bar in said pilot hole to center said bearing with respect to said pilot hole.

3. The boring bar apparatus of claim 1, where:
said drive apparatus includes a threaded rod rotatably supported in parallel relationship with respect to said boring bar, and an indexing mechanism for incrementally rotating said threaded rod with each rotation of said boring bar; and
a coupling member connected between said threaded rod and said boring bar converts rotation of said threaded rod into axial translation of said boring bar, said coupling member including a first end in threaded engagement with said threaded rod and a second end including a clamping mechanism that is selectively clamped to secure said coupling member to said boring bar for imparting axial translation to said boring bar and unclamped to permit axial translation of said boring bar with respect to said coupling member.

4. The boring bar apparatus of claim 3, further comprising:
a disengagement mechanism manually actuable to disengage said indexing mechanism to permit rotation of said threaded rod independent of said boring bar.

5. The boring bar apparatus of claim 4, where:
said indexing mechanism includes a cam rotatably driven with said boring bar, a gear affixed to said threaded rod, a linkage assembly coupling said cam to said gear, and a spring biasing said linkage assembly into engagement with said gear; and
said disengagement mechanism includes a lever coupled to said linkage assembly that is manually actuable to lift said linkage assembly out of engagement with said gear against the bias of said spring.

6. The boring bar apparatus of claim 1, where:
said drive apparatus includes a hydraulic motor for rotating said boring bar.

7. The boring bar apparatus of claim 1, where:
said drive apparatus is supported in an open housing defined by a pair of metal plates separated by a plurality of spacers distributed about peripheral margins of said metal plates; and
said inboard end of said drive apparatus support arm is affixed to one of said metal plates for supporting said drive apparatus and said boring bar.

8. The boring bar apparatus of claim 1, further comprising:
a wheel secured to the outboard portion of said boring bar; and
a rotary cutting tool mounted in a radial periphery of said wheel.

\* \* \* \* \*